United States Patent [19]
Sullivan et al.

[11] 4,146,373
[45] Mar. 27, 1979

[54] BUSHING CONSTRUCTION

[75] Inventors: Timothy A. Sullivan, Columbus; Barclay P. Gano, Granville, both of Ohio

[73] Assignee: Owens-Corning Fiberglas Corporation, Toledo, Ohio

[21] Appl. No.: 864,047

[22] Filed: Dec. 23, 1977

[51] Int. Cl.² .......................................... C03B 37/00
[52] U.S. Cl. .................................. 65/1; 65/2; 65/11 R; 65/374 RM; 65/DIG. 4; 432/251
[58] Field of Search ........................ 220/9 F, 21.5, 201; 432/251; 65/1, 2, 11 W, 11 R, 374 RM, DIG. 4

[56] References Cited
U.S. PATENT DOCUMENTS

| | | | |
|---|---|---|---|
| 2,561,933 | 7/1951 | Longenecker | 432/251 |
| 3,164,457 | 1/1965 | Mitchell et al. | 65/1 |
| 3,272,609 | 9/1966 | Benton | 65/11 W X |
| 3,597,180 | 8/1971 | Erickson | 65/11 W X |
| 3,840,358 | 10/1974 | Whitfield | 65/1 |

Primary Examiner—Robert L. Lindsay, Jr.
Attorney, Agent, or Firm—Ronald C. Hudgens; Kenneth H. Wetmore; Allen D. Gutchess, Jr.

[57] ABSTRACT

Improved construction for bushings used to produce glass fibers is provided. Such bushings commonly have thin side and end walls of precious metal defining a glass-melting chamber, with a bottom in which fiber-forming tips are located. Refractory material is located around the side and end walls. When the bushings are heated to operating temperatures, the metal walls tend to expand more than the refractory material and, particularly with larger bushings, the walls can buckle and crack since full expansion of the walls is prevented by the refractory material. To overcome this, it has been found that the bushings can be constructed with space between the metal walls and the refractory, with the space equalling the difference in expansion of the two materials. The space is formed by layers of heat-removable material, such as wax which melts out as the bushings are heated. When the bushings are at operating temperature then, the metal walls expand into the space and come into contact with the surrounding refractory material.

8 Claims, 4 Drawing Figures

BUSHING CONSTRUCTION

This invention relates to an improved construction for melters for heat-softenable material and particularly for bushings employed to produce glass fibers.

A bushing used in the production of glass filaments or fibers has thin metal side and end walls and a bottom which form a melting chamber, with the bottom having bushing tips therein from which molten glass is attenuated to produce the glass fibers. The walls and bottom are made of precious metal, usually a platinum alloy, capable of withstanding the elevated operating temperature of the bushing. The end walls of the bushing have electrical terminals or ears thereon between which current is passed through the bushing walls to heat the same to operating temperature. Thick refractory material surrounds the bushing walls to provide both an insulating effect and structural support for the walls.

In the construction of the bushing, the refractory material is commonly cast around the platinum walls and in contact therewith at room temperature. The coefficient of expansion of the platinum exceeds the coefficient of expansion of the refractory material. Consequently, when the bushing is subsequently heated to operating temperature, the platinum walls tend to expand to a greater extent than the surrounding refractory material or body. Particularly with larger bushings, the walls tend to be stressed because the refractory material prevents physical expansion of the platinum walls to the desired extent. Consequently, especially with larger bushings (e.g., with 4000 bushing tips) the side walls may crack or buckle when heated from room temperature. Even when physical buckling or cracking of walls does not occur, excessive stress in the walls can result in poor operating performance of the bushing and premature bushing failure.

In accordance with the invention, when the platinum side walls, end walls, and bottom have been fabricated, a layer of heat-removable material is placed around the outer surfaces of the side and end walls. Subsequently, the refractory material is cast in place around the layers in the usual manner, except that the refractory is in contact with the outer surfaces of the layers rather than in contact with the outer surfaces of the platinum walls. When the bushing is heated, the heat-removable material is removed by the time the bushing reaches operating temperature. In a preferred form, the heat-removable layers are of pattern-makers' wax which softens and drains from the bushing when it is brought to operating temperature.

The layer of the heat-removable material preferably has a thickness substantially equal to the difference in expansion of the metal walls and the refractory material when the bushing is heated from room temperature to operating temperature. Consequently, the space that would otherwise result when the heat-removable material is removed during heating of the bushing becomes substantially nonexistent as the bushing walls expand at a greater rate than the refractory and substantially come into contact with the refractory by the time the operating temperature is reached.

It is, therefore, a principal object of the invention to provide an improved melter for heat-softenable material with the melter being made of metal walls surrounded by refractory material.

Another object of the invention is to provide an improved continuous filament, textile bushing.

A further object of the invention is to provide an improved fiber-forming bushing construction in which the metal walls of the bushing are less subjected to stress.

Yet another object of the invention is to provide a fiber-forming bushing having metal walls surrounded by refractory material, which bushing has a longer life and better operating performance.

Yet a further object of the invention is to provide an improved method for making a fiber-forming bushing by initially forming the refractory material spaced from the metal walls of the bushing.

Many other objects and advantages of the invention will be apparent from the following detailed description of a preferred embodiment thereof, reference being made to the accompanying drawings, in which.

Figure 1:
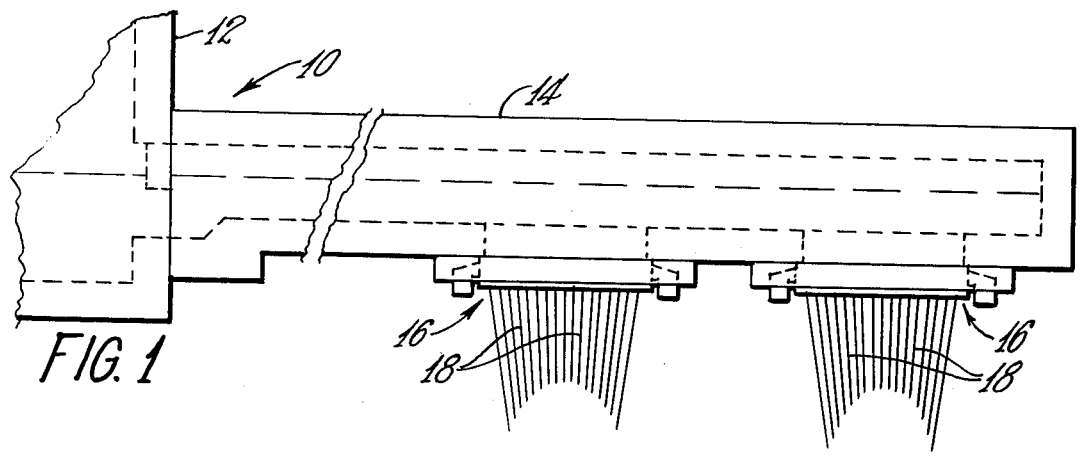
FIG. 1 is a fragmentary, schematic side view in elevation of a glass-melting furnace, a forehearth, and bushings embodying the invention below the forehearth.

Referring to the drawings, and particularly to FIG. 1, a glass-melting furnace is indicated at 10 and includes a melting tank 12 from which molten glass is discharged through a forehearth 14. From the forehearth, the molten glass flows through fiber-forming bushings and, specifically, continuous filament, textile bushings 16 embodying the invention. Glass fibers or filaments 18 are attenuated from the bushings as is well known in the art.

Figure 2:
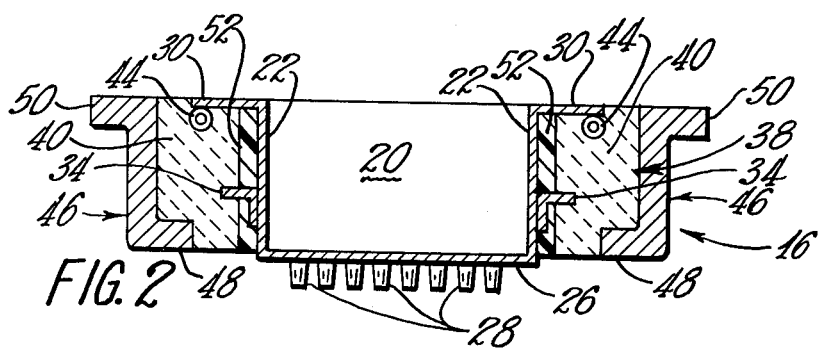
FIG. 2 is a view in transverse cross section through one of the bushings of FIG. 1 when being constructed at room temperature.
Figure 3:
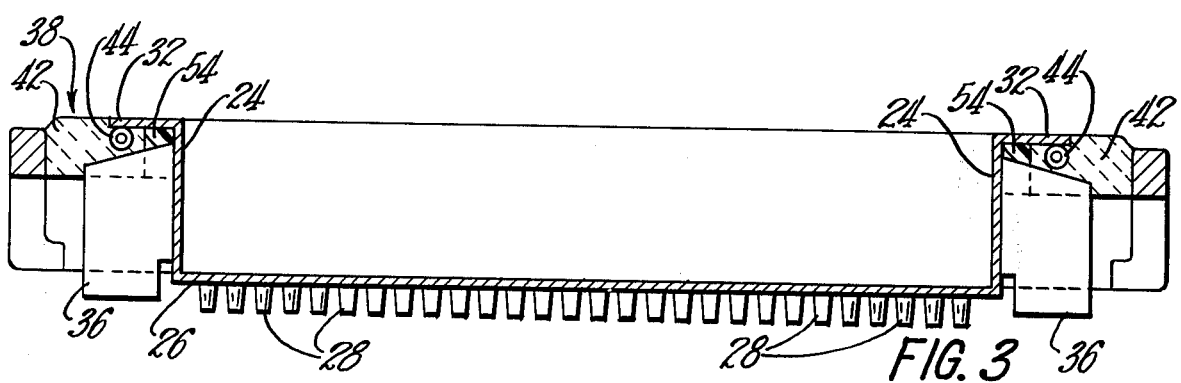
FIG. 3 is a view in longitudinal cross section through the bushing of FIG. 2 when being constructed.
Figure 4:
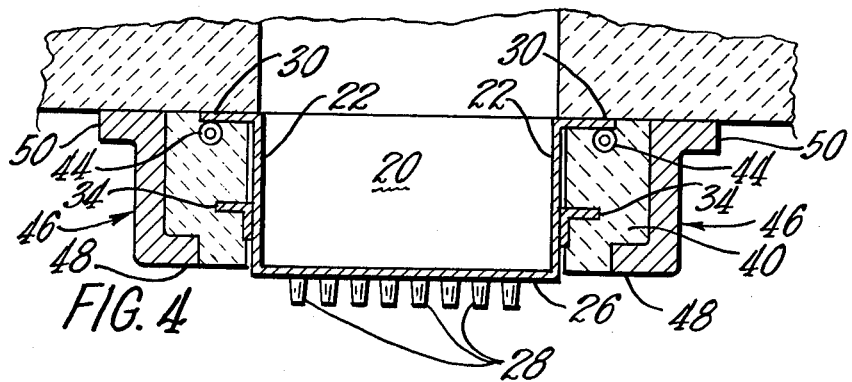
FIG. 4 is a view in transverse cross section of one of the bushings of FIG. 1 at an elevated, operating temperature.

Referring more particularly to FIGS. 2-4, each of the bushings 16 has a central chamber 20 for molten glass which is formed by metal side walls 22, end walls 24, and a bottom 26. The walls and bottom are made of precious metal, usually a platinum alloy. The bushing bottom 26 has bushing tips 28 having holes or orifices, with molten glass in the chamber 20 being attenuated through the tips 28 to form the filaments 18. Horizontal side flanges 30 and end flanges 32 extend outwardly from the upper edges of the side and end walls. Electrical terminals or ears 36 are also provided on the end walls 24 to supply current through the bushing walls to heat the same and melt or maintain in a molten state the glass to be attenuated into the filaments or fibers. The side walls 22 also have intermediate horizontally-extending flanges 34 affixed at intermediate points and extending outwardly therefrom for additional strength.

A body 38 of refractory material surrounds the side and end walls 22 and 24 to insulate the bushing and to provide support for the precious metal walls at their elevated operating temperatures. The refractory body 38 includes side portions 40 extending longitudinally of the bushing and end portions 42 extending transversely thereof and provided with recesses for the electric terminals 36. A cooling coil or tube 44 is cast into the refractory and is positioned directly below the flanges 30 and 32. This tube is effective to freeze any molten glass tending to leak around the flanges 30 and 32 and to maintain that glass in a solid state to provide a seal.

A metal supporting frame 46 is located around the periphery of the refractory body 38. The frame 46 has inwardly extending lower flanges 48 for aiding in supporting the refractory body 38 and has outwardly-extending upper flanges 50 which are used to attach the bushing to the bottom of the forehearth 14.

Heretofore, the refractory body 38 was formed by casting refractory material directly into the cavity between the bushing walls 22 and 24 and the frame 46, the casting normally being done at or about room temperature. Consequently, the refractory material was directly in contact with the outer surfaces of the bushing walls 22 and 24 and with the frame 46. After the bushing was made and was being heated to operating temperature, the bushing walls 22 and 24 tended to expand at a greater rate than the refractory portions 40 and 42, the metal having a greater coefficient of expansion than the refractory material. With the expansion of the metal side walls 22 and 24 thereby being physically restrained by the refractory, there maybe a tendency for the metal walls to buckle or crack. This was particularly true in thin-walled, larger bushings, for example, those holding over ten pounds of molten glass and having several thousand bushing tips in the bottom. Even if physical changes did not occur in the side and end walls of the bushings, nevertheless, excessive stress would often be produced therein. This stress resulted in poor operating performance of the bushing and/or premature failure of the bushing, requiring earlier replacement thereof.

In accordance with the invention, it has been found that by spacing the refractory body 38 and specifically the side and end portions 40 and 42 thereof from the metal bushing walls 22 and 24 when the bushing is being constructed, the bushing walls can expand at a greater rate when heated to fill the space initially provided between the bushing walls and refractory. This enables the metal walls to fully expand at their own rate without resulting in stresses therein.

Also in accordance with the invention, to provide the spaces between the refractory material and the metal walls, layers 52 of heat-removable material are positioned contiguous with the outer surfaces of the bushing side walls 22 and layers 54 of heat-removable material are positioned contiguous with the outer surfaces of the bushing end walls 24. The dimensions of the bushing walls and the coefficient of expansion can be used to calculate the total dimensional changes of the bushing walls between room temperature and operating temperature. The dimensional changes of the refractory body 38 can be similarly determined. The width of the space between the bushing walls and the refractory body can then be calculated to achieve the amount of relief needed for the bushing walls. The layers 52 and 54 are then formed to the desired thickness to achieve the proper initial spacing between the bushing walls and refractory body at room temperature. Solely by way of example, for a particular bushing holding fifteen pounds of molten glass and having four thousand bushing tips, the layers 52 along the side walls 22 of the bushing can be 1/16th inch thick and the layers 54 at the end walls 24 of the bushing can be ⅛ inch thick, the bushing expanding longitudinally more than transversely, of course.

After the layers 52 and 54 are applied to the bushing walls, the refractory is then cast in place according to standard refractory set-up procedures. As the bushing is then heated to operating temperature, the heat-removable material forming the layers 52 and 54 is removed. At the same time, the resulting space between the side walls 22 and the refractory portions 40 and between the end walls 24 and the refractory portions 42 diminishes as the bushing walls expand more than the refractory. With the proper spacing, the space diminishes essentially to zero, as shown in FIG. 4, when the bushing operating temperature is reached.

The layers 52 and 54 of heat-removable material are not applied around the horizontal supporting flanges 30 and 32 or around the intermediate flanges 34 so that they can remain in direct contact with the refractory body 38 for support.

In the preferred form, the heat-removable material is a wax, preferably a commercially-available one supplied in sheet form. The sheets are sufficiently thin that several can be built up to the desired thickness of the layers. As the bushing reaches elevated temperatures, the wax simply then melts and drains out of the location between the bushing and the refractory body. Of course, other heat-softenable materials which are compatible with the precious metal of the bushing walls can be employed and other substances which would burn or vaporize at elevated temperatures can also be used.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. In a method of making a melter for heat-softenable material, which method comprises producing a chamber having metal side walls, placing refractory material around the outside of said side walls, and heating the melter to an elevated operating temperature, the improvement comprising positioning a layer of heat-removable material between the refractory material and the metal side walls prior to heating said melter, said layer having a thickness not substantially less than the difference between the expansion of said metal side walls and said refractory material at the elevated operating temperature, said heat-removable material being removed from between said refractory material and said side walls by heat at a temperature not exceeding the elevated operating temperature of the melter, whereby said metal side walls will expand to be substantially in contact with said refractory material at the elevated operating temperature of the melter.

2. A method according to claim 1 characterized by positioning the layer of heat-removable material between the refractory material and the metal side walls by placing the layer of heat-removable material contiguous with the metal side walls and subsequently placing the refractory material around the heat-removable material layer prior to heating the bushing.

3. A method according to claim 2 characterized by casting the refractory material around said heat-removable layer.

4. In a method of making a continuous filament, textile bushing for producing glass filaments, which method comprises fabricating a chamber having precious metal side walls and end walls, casting refractory material around the outside of said walls, and heating the bushing to an elevated operating temperature, the improvement comprising positioning a layer of heat-removable material on the outside surfaces of said side walls and said end walls prior to casting the refractory material in place, said layer of heat-removable material being removed by the time said bushing is heated to the elevated operating temperature, with the thickness of the layer of heat-removable material on the outside surfaces of said end walls being substantially equal to the difference between the expansion of said metal side walls and said refractory material at the elevated operating temperature, and with the thickness of the layer of the heat-removable material on the outside surfaces of said side walls being substantially equal to the difference between the expansion of said metal end walls and said refractory material at the elevated operating temperature, whereby said metal side walls will expand to be substantially in contact with the refractory material and said metal end walls will expand to be substantially in contact with the refractory material when the bushing reaches the elevated operating temperature.

5. A continuous filament, textile bushing comprising a chamber formed by metal side walls, end walls, and a bottom, said side walls having outwardly-extending, generally horizontal flanges at upper edges thereof, refractory material surrounding said side walls and said end walls and in contact with the lower surfaces of said horizontal flanges, and layers of heat-removable material located between at least substantial portions of said side walls and the refractory material and between at least substantial portions of said end walls and said refractory material when the bushing is at room temperature, said layers of heat-removable material being removed by the time said bushing is heated to an elevated operating temperature, with the thickness of the layer of heat-removable material between said end walls and said refractory material being substantially equal to the difference between the expansion of said metal side walls and said refractory material at the elevated operating temperature, and with the thickness of the layer of heat-removable material between said side walls and said refractory material being substantially equal to the difference between the expansion of said metal end walls and said refractory material at the elevated operating temperature, whereby said metal side walls will expand to be substantially in contact with the refractory material and said metal end walls will expand to be substantially in contact with the refractory material when the bushing is at the elevated operating temperature.

6. A continuous filament, textile bushing according to claim 5 characterized by said side walls having outwardly-extending flanges thereon below the upper edges thereof in contact with said refractory material.

7. A continuous filament, textile bushing according to claim 5 characterized by said heat-removable material being a heat-softenable material.

8. A continuous filament, textile bushing according to claim 7 wherein said heat-softenable material is wax.

* * * * *